United States Patent Office 2,864,779
Patented Dec. 16, 1958

2,864,779

PROCESS OF PREPARING UREA-FORMALDE-
HYDE MOLDING POWDERS

Henri Le Bihan, Liege, Jean André Robert Godart, Tilff, and Raymond Alphonse Burton, Liege, Belgium, assignors to Societe Belge de L'Azote et des Produits Chimiques du Marly, S. A., Liege, Belgium No Drawing. Application July 25, 1956
Serial No. 599,899

Claims priority, application Belgium August 2, 1955

3 Claims. (Cl. 260—17.3)

This invention relates to improved processes for the preparation of urea-formaldehyde molding powders, which remain stable under normal storing conditions and which set rapidly during molding operations.

In heretofore employed processes, it has been customary to make urea and formaldehyde react so as to obtain a syrup formed by a solution or suspension of an intermediate urea-formaldehyde condensate to which is added a charge, preferably of a cellulosic nature. Thereafter, the mixture is intimately stirred or kneaded so that the charge is completely steeped in the resin. The moist substance is thereupon dried without, however, being completely dehydrated because a certain quantity of water acts as plasticizer during the molding operation. After the substance is dried, a hardening catalyst is added and is one which, at the temperature of the molding operation, will free an acid, thus speeding up the complete polymerization of the resin. In as much as it is important that the catalyst be evenly distributed in the resin, the mixture is again kneaded, for example, in a ball mill.

These operations, which are necessary if powders with a uniform quality and composition are to be obtained, require long periods of time and costly equipment and labor for the treatment of the various products and their handling. Moreover, the obtained powder is in a pulverulent form and for molding purposes has various drawbacks, such as a high ratio of overly fine particles, difficulties in connection with the filling of the molds, a tendency of setting in bulk when stored, and so forth.

In accordance with a process of the invention, a finely pulverized cellulose charge or filler is employed, wherein are incorporated, in one single stage, the urea-formaldehyde steeping syrup, the hardening catalyst and, as the case may be, other additives, such as colorants and mold lubricants. Thus, the drawbacks of the known processes are avoided, and molding powders, based on urea-formaldehyde resin in granular form, can be prepared in a comparatively simple manner and more economically.

With respect to processes of the invention, it has been established that a catalytic mixture consisting of melamine, melamine sulfate and hexamethylene tetramine produces, as compared with currently used catalysts, a smaller evolution speed and greater heat stability against the temperatures of the preparation of these new powders.

Owing to its high thermal stability, this catalytic compound may be added to the resinous composition when kneaded and before it is dried, thus permitting elimination of the pulverization in a ball mill.

On the other hand, it has been established in manufacturing practice that, in incorporating a very finely divided cellulose filling into the urea-formol (formic aldehyde) condensates, instead of a simply shredded filling or a filling in fibrous form, it is easier to obtain homogeneous products in granular form, thus offering numerous advantages for the molding operation, such as a saving of time and of materials.

On the basis of these findings, the invention allows the preparation of urea-formaldehyde molding powders with a reduced number of operations, simply comprising the condensation of urea and of formaldehyde, the kneading of the condensate product, of the filling, of the catalytic compound, and as a contingency, of dyes and other additives, and thereafter, the drying of the obtained granules.

When preparing the steeping syrup, the formation of non-resinous, infusible products should be avoided and the condensation should be directed toward the formation of mono- and dimethylolureas.

The latter will be produced if the reactive medium is neutral, or even slightly acid. In order to maintain the pH at a value in the vicinity of the neutral, a buffer is added, such as, for example, a carbonate or a metal oxide.

After eliminating the buffering agent in suspension from the condensation product by filtration, the cellulose filling and the catalytic hardening compound are added to the latter by kneading.

The structure and nature of the filling entering into the composition of molding powders may vary, but preferably a finely divided cellulose filling is employed, such as is obtained, for example, by pulverization in a micro-atomizer. The thus obtained fine particles are quickly and completely wrapped up and steeped by the urea-formaldehyde condensation product.

The catalytic compound being added, according to this invention, during the kneading operation, has the object of producing the setting of the powder in the course of the molding process. In the catalytic mixture, the sulfate of melamine, which will break down under the heat of the molding operation while liberating sulfuric acid, constitutes the main setting agent. The hexamethylene tetramine seems to act at the same time as a thermal stabilizer in the face of the temperatures under which the molding powder is being prepared, and as an agent, speeding up the breakdown under the temperature of the molding operation, without, however, provoking the formation of heterogeneous masses which occur in the presence of too violent a setter (hardener). On the other hand, the melamine likewise strengthens the catalytic action of the melamine sulfate, and, moreover, improves on certain properties, such as the resistivity of the products molded from urea-plastic powders against hot water.

Certain auxiliary agents, such as mold lubricants, condensation retarders, and so forth, can likewise be introduced during the kneading operation.

The kneading is preferably done in two stages: in the first stage, the cellulose filling is steeped in resin, and in the second stage, the thus obtained product is mixed with the catalytic compound and the auxiliary agents. In this manner a homogeneous product is obtained, in the form of easily moldable granules. Moreover, owing to the presence of accelerators during the second kneading stage, the pH created is directed toward a value indicating a slightly acid medium and the urea-formaldehyde condensation product commences to polymerize, thus permitting a faster curing of the obtained molding powder.

In order to prepare colored molded products, the coloring substances are preferably introduced into the kneader before introducing the filling agent in order to obtain a better dispersion of such substances in the condensation product and a mixture with a uniform coloring.

After the kneading operation is completed, the obtained product, if it is to be stored for relatively long periods of time, is cooled to room temperature so as to avoid any progress of the polymerization of the resin. It will suffice, for example, to pass through the substance, which is in a hopper, a current of cold and filtered air.

Before being sent to the dryer, the product is sifted, so as to eliminate the small quantity of particles which are too large (average diameter exceeding 1 mm.), which latter are again introduced into the kneader.

The molding powder in granules is thereafter dried, thus eliminating volatile substances and excess water, in any appropriate device permitting, preferably, a temperature of from 45 to 50 deg. C. to be maintained in the product. Under such conditions, the setting compound will not be subject to any premature breakdown, so that the powder, having been obtained in the form of granules, will have a homogeneous structure and a very high reactive potential. The powder can be molded quickly, preferably at a temperature of 145 deg. C., and in the course of one minute.

The selection of this temperature depends on economical and technical considerations, because, while it may vary within considerable limits, it nevertheless should not be too high inasmuch as thereby the shaped products may become heterogeneous; nor should it be too low, so as not to require overly extended molding times.

The example is an embodiment of the preparation of urea-formaldehyde molding powder according to the invention, the invention, however, not being restricted to the embodiment shown.

*Example.*—In an enameled autoclave, having a capacity of 100 litres and being provided with an arm agitator, are placed 26.8 kgs. of 40% formaldehyde; thereafter, 13.2 kgs. urea are added, and the mixture is heated to approximately 25 deg. C., until the urea is completely dissolved. Thereupon, 300 cc. ammoniacal liquor ($d^{15°}$:0.910) and 11 grams zinc oxide as the buffering agent are added. The mixture is heated to 45 deg. C., while being continuously stirred, and 200 grams hexamethylene tetramine are added, to stabilize the condensation to the state of mono- and dimethylolureas and to prevent the formation of methylene urea.

After separation of the zinc oxide by filtration, 40 kgs. of a limpid condensation product are obtained, which is introduced in a kneader where it is intimately stirred with 11.5 kgs. of finely pulverized paper, while the temperature is maintained at 45 deg. C. After the filling is steeped with the condensation product, the catalytic compound, comprising 140 grams melamine, 140 grams melamine sulfate and 150 grams hexamethylene tetramine is added thereto, as well as 200 grams zinc stearate as mold lubricant. The kneading is still continued at a temperature of 45 deg. C., until granules are obtained, these granules adhering to each other. The granules, however, are easily separated, mainly by sifting.

Thereafter, these granules are dried in a rotary furnace with hot air being injected thereinto, while the temperature is kept in the product at from 45 to 50 deg. C. In this way a powder is obtained, which is stable when stored and which can be easily molded during one minute, at a temperature of 145 deg. C.

What we claim is:

1. A process for the preparation of urea-formaldehyde molding powders in the form of granules, comprising the incorporation of 25 parts by weight of finely pulverized paper and 10 to 15 parts of a setting catalyst composed of 30 to 35% melamine, 30 to 35% sulfate of melamine and 30 to 40% hexamethylene tetramine at a temperature not exceeding 45° C. into 100 parts of a urea-formaldehyde condensation product consisting of a mixture of mono- and dimethylolureas, and the subsequent drying of the product thus obtained with the catalyst therein.

2. A process as claimed in claim 1 wherein the paper is finely pulverized and steeped in the urea formaldehyde condensation product before kneading with the other constituents of the molding powder.

3. A process as claimed in claim 1 wherein the granules obtained after the kneading operation are dried at a temperature of 45° to 50° C. in said granules.

References Cited in the file of this patent

UNITED STATES PATENTS

| | | |
|---|---|---|
| 2,143,413 | Ellis | Jan. 10, 1939 |
| 2,287,756 | Brookes | June 23, 1942 |
| 2,494,095 | Hull | Jan. 10, 1950 |
| 2,589,567 | Nickerson | Mar. 18, 1952 |
| 2,624,514 | Wilhousky | Jan. 6, 1953 |